United States Patent Office 2,916,478
Patented Dec. 8, 1959

2,916,478

POLYMERIZATION PROCESS

Allen R. Kittleson and Robert M. Thomas, Westfield, N.J., and Alexis Voorhies, Jr., Baton Rouge, La., assignors to Esso Research and Engineering Company, a corporation of Delaware No Drawing. Application July 9, 1956
Serial No. 596,430

2 Claims. (Cl. 260—94.9)

This invention relates to an improvement in polymerization processes, and more particularly to the polymerization of unsaturated hydrocarbons such as ethylene, with a catalyst mixture or complex of an alkyl metal compound, e.g., diethyl aluminum chloride, and a compound of a metal element of group IV($b$)–VI($b$) of the periodic table of the elements, e.g., titanium tetrachloride, to make high molecular weight solid polymers or copolymers.

Ethylene has been polymerized by such a general process as, for instance, by passing ethylene gas into a liquid diluent such as heptane containing dissolved or dispersed therein a catalyst mixture or complex formed by mixing triethyl aluminum or diethyl aluminum chloride with titanium tetrachloride, using a polymerization temperature of, for instance, 50 to 100° C. and substantially atmospheric pressure. The reaction mixture is agitated continuously and polymer forms in the form of a powder or granules dispersed in the diluent; more diluent may be added if the reaction mixture becomes too thick or viscous.

Although such a process is a substantial improvement over the only previously commercially successful process for making high molecular weight polyethylene, namely, by the use of high pressure process such as 200 to 2,000 atmospheres, at a temperature of 100 to 400° C, and with either a trace of oxygen or an organic peroxide as catalyst, nevertheless it has several disadvantages frequently including requirement to pretreat the catalyst for about one-half hour or one hour or so before starting polymerization. For example, when using n-heptane as reaction medium and not using a catalyst pretreatment step, there was no spontaneous ethylene polymerization when starting at room temperature. On applying heat to increase the temperature to 58° C. during the first hour, a total of 10 g. of polymer was obtained during the period.

A substantial improvement in reaction rate, particularly at room temperature, was obtained by the use of chlorobenzene instead of part or all of the n-heptane as reaction diluent, or both as catalyst solvent and reaction diluent.

According to the present invention, it has now been found that even better results are obtained if chlorobenzene is used only as catalyst solvent and catalyst formation medium and then n-heptane or other inert hydrocarbon liquid used as reaction diluent.

The invention may be applied to the polymerization of various unsaturated hydrocarbons such as ethylene, propylene, normal butenes, isobutylene, and higher alkenes, having, for instance, up to 8 or 10 carbon atoms, as well as diolefins, e.g., butadiene, isoprene, etc.

In preparing the catalyst, the alkyl metal compound to be used, is preferably one having the general formula $R_2AlX$, or one having the general formula $R_3Al$, in which R is preferably a lower alkyl group such as ethyl, propyl, butyl, or higher, e.g., up to 8 to 10 carbon atoms, or sometimes methyl; and X is a halogen, preferably chlorine. Dialkyl, particularly diethyl, aluminum chloride is preferred. The compound of a metal of groups IV($b$) to VI($b$) may be a halide, oxide, or other compound of elements 22 to 24, 40 to 42, 58, 72 to 74, and 90 to 92. Titanium tetrachloride is the preferred example of such metal compounds. The mixture or complex of these two catalyst components should be prepared by using a molar ratio of the alkyl aluminum compound to the titanium tetrachloride ranging from about 0.5/1 to 10/1, the preferred proportions being about 1/1 to 3/1.

The inert hydrocarbon liquid to be used as reaction diluent should be generally an aliphatic hydrocarbon having about 5 to 20 or so carbon atoms, e.g. pentane to eicosane, or refined mixtures thereof such as a refined petroleum light naphtha or heavy naphtha or even a kerosene or gas oil fraction.

The above-mentioned reaction diluent, as well as the chlorobenzene to be used as catalyst solvent, and the olefin to be polymerized, should all be purified, if necessary, to remove impurities such as moisture, oxygen, etc., which reduce the catalyst activity or otherwise interfere with the polymerization.

The catalyst may be prepared in various ways, but it is convenient and preferred, to dissolve the desired amount of each of the above-mentioned two separate catalyst components in chlorobenzene, and then either mix the two resulting solutions with each other first and then add the mixed solutions to the polymerization reactor, or to add the separate catalyst component solutions directly to the polymerization reactor. These solutions may be prepared and added to the reactor at room temperature, and in contradistinction to corresponding solutions in n-heptane, do not require any special catalyst pretreatment, such as a holding or mixing at some elevated temperature.

The polymerization reactor is charged with the desired amount of n-heptane or other inert hydrocarbon diluent. This may be done prior to addition of catalyst, or simultaneously therewith, or, as is frequently desirable, part of the diluent may be added prior to polymerization and then additional amounts added during the course of polymerization.

It is, of course, essential or at least desirable, to prevent contact of the catalyst components or complex with oxygen, moisture, or other harmful materials which interfere with the desired polymerization of the ethylene to high molecular weight solid polymer. This may be done by blanketing the catalyst containers, polymerization reactor, etc., with nitrogen or other suitable inert gas.

The temperature to be used during the polymerization may vary over a fairly wide range, for instance, about 0 to 100° C., although it is preferred to carry out the reaction isothermally at temperatures of 40–80° C. The pressure may be substantially atmospheric or, if desired, a slightly elevated pressure up to 5 or 10 atmospheres. Atmospheric pressure is preferred.

According to the present invention, when using chlorobenzene as catalyst solvent, and an inert hydrocarbon liquid as reaction diluent, the rate of polymerization is found to be not only greater than when a hydrocarbon is used both as catalyst solvent and reaction diluent, but also even better than when chlorobenzene is used both as catalyst solvent and as reaction diluent, and appreciably better than when a hydrocarbon is used as catalyst solvent and cholorbenzene used as reaction diluent. Thus, the advantages of this invention are distinctly surprising.

Not only does the present invention obtain a superior polymerization rate, which may be measured by the weight of polymer obtained per weight of catalyst used, per hour of polymerization (e.g. gms.pol./gms.cat./hr.), but also it obtains a substantially higher efficiency than the other polymerization techniques mentioned above. Thus, the present invention provides a tremendous practical advantage in commercial operation, mainly that a much larger amount of polymer can be produced in any certain period of time than can be produced by the other combinations of catalyst solvent and reaction diluent. In spite of this great commercial advantage of higher polymer production rate, the polymer product quality is excellent, the Harris molecular weight being, for instance, in the same general high range as obtained with the other combinations of catalyst solvent and reaction diluent.

After the polymerization has proceeded to the desired extent, preferably until the catalyst activity becomes reduced below a practical value, the reaction is stopped by adding a suitable inactivator such as 10 to 30% or so of isopropanol, isobutyl alcohol or other alcohol, directly to the reactor and then stopping the ethylene feed. The polymer may be suitably recovered by filtration to remove the major portion of liquid diluent and then the resulting filter cake may be slurried by mixing it with an additional amount of isopropanol, which may suitably be about 1 to 5 times the amount used for inactivating the reaction.

purified ethylene gas into a polymerization reactor containing a catalyst-diluent slurry having an initial catalyst concentration of 0.3 weight perecent. This slurry resulted from mixing with a reaction diluent, shown in the following table, a catalyst dispersion, which in each case had been prepared by mixing solutions of the two separate catalyst components in the catalyst solvents, as shown in the following table, at 130° F. for 15 minutes. The catalyst components used were diethyl aluminum chloride and titanium tetrachloride, and they were used in a molar ratio of 1/1.

After the polymerization had been carried out for the indicated time, the catalyst was inactivated by addition of isopropyl alcohol, and the polymer was washed with isobutyl alcohol, dried, weighed, and tested for molecular weight. The results of these 5 runs are shown in the following table, run 5 being the one which respresents the present invention.

*Table I*

| Run No. | 1 | 2 | 3 | 4 | 5 |
| --- | --- | --- | --- | --- | --- |
| Catalyst Diluent | Kerosene base [1] | Kerosene base | Chlorobenzene | 10% $C_6H_5Cl$ in kerosene base. | Chlorobenzene. |
| Polymerization: | | | | | |
| Diluent | do | Chlorobenzene | do | 10% $C_6H_5Cl$ | Kerosene base. |
| Final Diluent Composition | 100% kerosene base | 87% $C_6H_5Cl$, 13% kerosene base. | 100% chlorobenzene. | 90% kerosene base | 13% $C_6H_5Cl$, 87% kerosene base. |
| Product: | | | | | |
| Yield. gms | 335 | 325 | 291 | 395 | 510. |
| Harris Mol. Wt. $\times 10^{-3}$ | 155 | 103 | 235 | 166 | 127. |
| Cat. Eff., gms./gm | 127 | 123 | 109 | 150 | 193+. |
| React. Rate, gms./hr./gm | 31.8 | 30.8 | 31.0 | 36.0 | 44.5. |

[1] Highly refined.

The resulting slurry may then be stirred, desirably for 5 to 30 minutes or so, preferably for about 15 to 20 minutes, while heating it to a temperature of about 50 to 80° C., preferably about 60 to 70° C., to assist in removing residual catalyst constituents from the polymer. If desired, the ash content of the polymer may be even further reduced by washing the granular polymer in a liquid chelating agent such as acetyl acetonate, or a solution thereof in butyl alcohol or other solvent. The slurry is finally filtered, and the polymer dried to give a granular powder. In the case of polyethylene, the molecular weight will depend on several variables, such as the catalyst components and proportions thereof, and the polymerization temperature, but normally will be from about 5,000 to 500,000 and preferably about 50,000 to 300,000, as determined by the Harris modification of the Staudinger method.

Although heretofore it has been difficult or impossible to obtain, with catalysts of this type, a polymerization rate more than about 30 to 40 or so grams of polymer per gram of catalyst per hour, the present invention has obtained polymerization rates in the range of 45 to 50 or more grams of polymer per gram of catalyst per hour. Also, whereas catalyst efficiencies have heretofore been generally in the range of about 20 to 150 grams of polymer per gram of catalyst, the present invention has given substantially higher catalyst efficiencies ranging generally from 175 upward.

By reason of the fact that the present invention does not require any catalyst pretreating time or special handling, and there is substantially no polymerization induction period, the process of this invention can be carried out not only batchwise but preferably by continuous operation.

The objects and advantages of this invention will be better understood from a consideration of the following experimental data:

EXAMPLE I

A series of 5 runs were made in which ethylene was polymerized at 140° F. for 3.5–4.0 hours by bubbling The above data show that the present invention, as represented by run 5, in which chlorobenzene was used as catalyst solvent, and refined kerosene was used as reaction diluent, obtained the highest polymerization reaction rate, i.e. 44.5 grams of polymer per gram of catalyst per hour, compared to 30–36 for the other runs in which various other combinations of catalyst solvent and reaction diluent were used. The present invention also obtained an exceedingly high catalyst efficiency of over 193 grams of polymer per gram of catalyst, compared to 109–150 for the other runs. Also, the total polymer yield obtained by the present invention was 510 grams of polymer compared to only 291–395 for the other 4 runs. The polyethylene produced by the present invention had a Harris molecular weight of 127,000 which is very satisfactory, as it is within the desired high molecular weight range of 50,000 to 300,00 Harris molecular weight.

In general the polymers prepared according to the technique of this invention show the characteristic high quality, high softening and melting points and high degree of crystallinity exhibited by polymers prepared in the conventional all hydrocarbon media.

EXAMPLE 2

0.0044 mole of $AlEt_2Cl$ was added to 100 ml. of chlorobenzene. An equal molar quantity of $TiCl_4$ was similarly diluted. These two solutions were mixed and immediately added to 800 ml. of n-heptane at 60° C. Ethylene was bubbled into the stirred reactor maintain at 60° C. for a period of 2 hours. The rate of ethylene absorption during this period ranged from 1150–1270 cc. of gas per minute giving a polymerization rate of 51 grams of polymer per gram of catalyst per hour.

An identical run in which the catalyst components were mixed in 100% n-heptane gave an ethylene absorption rate of 700–800 cc. of gas per minute and a polymerization rate of 42 grams of polymer per gram of catalyst per hour.

These results show a marked effect of chlorobenzene on increasing the activity of this catalyst for polymerizing olefins.

It is not intended that this invention be limited to the specific examples and modifications which have been given merely for the sake of illustration but only by the appended claims in which it is intended to claim all novelty inherent in the invention as well as all modifications coming within the scope and the spirit of the invention.

What is claimed is:

1. In the process of polymerizing ethylene with a catalyst complex of $TiCl_4$ and $Al(C_2H_5)_2Cl$, in the presence of an inert substantially aliphatic hydrocarbon diluent at a temperature of about 20° to 100° C. and at a pressure of about 1 to 10 atmospheres, the improvement comprising making the catalyst complex by mixing a solution of $TiCl_4$ in chlorobenzene with a solution of $Al(C_2H_5)_2Cl$ in a medium consisting essentially of chlorobenzene, and then using a substantially larger proportion, a volume ratio of about 8:1 of the inert aliphatic hydrocarbon liquid as reaction diluent during the polymerization of the ethylene, whereby a minimum catalyst efficiency of 175 g./g. is obtained.

2. The process of making high molecular weight polymers from unsaturated hydrocarbon compounds selected from the group consisting of alkenes of 2 to 10 carbon atoms, butadiene and isoprene which comprises dissolving a titanium chloride in a medium consisting essentially of chlorobenzene, also dissolving an aluminum alkyl compound reducing agent in a medium consisting essentially of chlorobenzene, mixing said two resulting solutions to make a catalyst complex dispersion in chlorobenzene, feeding said catalyst dispersion into a polymerization reactor containing a substantially larger volume of reaction diluent consisting essentially of an inert substantially aliphatic hydrocarbon liquid, and then feeding the unsaturated compound to be polymerized into the reaction liquid with agitation, whereby a minimum catalyst efficiency of 175 g./g. is obtained.

References Cited in the file of this patent

UNITED STATES PATENTS

| | | |
|---|---|---|
| 2,586,322 | Franta | Feb. 19, 1952 |
| 2,692,257 | Zletz | Oct. 19, 1954 |
| 2,786,036 | Freimiller et al. | Mar. 19, 1957 |
| 2,827,446 | Breslow | Mar. 18, 1958 |
| 2,832,759 | Nowlin et al. | Apr. 29, 1958 |

FOREIGN PATENTS

| | | |
|---|---|---|
| 533,362 | Belgium | May 16, 1955 |
| 796,845 | Great Britain | June 18, 1958 |